(12) United States Patent
Benner, Jr.

(10) Patent No.: US 11,735,969 B2
(45) Date of Patent: Aug. 22, 2023

(54) HIGH TORQUE LOW INERTIA BRUSHLESS MOTOR

(71) Applicant: William R. Benner, Jr., Sorrento, FL (US)

(72) Inventor: William R. Benner, Jr., Sorrento, FL (US)

( * ) Notice: Subject to any disclaimer, the term of this patent is extended or adjusted under 35 U.S.C. 154(b) by 366 days.

(21) Appl. No.: 16/635,655

(22) PCT Filed: Jul. 31, 2018

(86) PCT No.: PCT/US2018/044614
§ 371 (c)(1),
(2) Date: Jan. 31, 2020

(87) PCT Pub. No.: WO2019/028031
PCT Pub. Date: Feb. 7, 2019

(65) Prior Publication Data
US 2021/0126500 A1   Apr. 29, 2021

Related U.S. Application Data

(60) Provisional application No. 62/539,247, filed on Jul. 31, 2017.

(51) Int. Cl.
| | |
|---|---|
| *H02K 3/16* | (2006.01) |
| *H02K 1/16* | (2006.01) |
| *H02K 21/14* | (2006.01) |
| *H02K 1/2706* | (2022.01) |
| *H02K 29/03* | (2006.01) |

(52) U.S. Cl.
CPC ............... *H02K 3/16* (2013.01); *H02K 1/165* (2013.01); *H02K 21/14* (2013.01); *H02K 1/2706* (2013.01); *H02K 29/03* (2013.01)

(58) Field of Classification Search
CPC ...... H02K 1/165; H02K 1/2706; H02K 21/14; H02K 23/36; H02K 29/03; H02K 3/00; H02K 3/12; H02K 3/16; H02K 21/16; H02K 3/345
See application file for complete search history.

(56) References Cited

U.S. PATENT DOCUMENTS

| | | | | |
|---|---|---|---|---|
| 5,045,742 | A * | 9/1991 | Armstrong ............. | H02K 1/146 310/216.013 |
| 2013/0076185 | A1* | 3/2013 | Benner, Jr. ............. | H02K 1/148 310/156.01 |

(Continued)

FOREIGN PATENT DOCUMENTS

| | | | |
|---|---|---|---|
| AU | 635198 B2 | * | 12/1988 |
| JP | 0785615 A1 | * | 7/1997 |

(Continued)

OTHER PUBLICATIONS

International Search Report dated Oct. 17, 2018 for PCT/US18/44614.

*Primary Examiner* — Naishadh N Desai
(74) *Attorney, Agent, or Firm* — Greenberg Traurig, LLP

(57) ABSTRACT

A brushless motor includes a rotor and a stator having four slots into which electrical coils are placed. The stator may include a means for limiting cogging. The brushless motor having a high torque constant, low coil resistance, low coil inductance, and high thermal conductivity is provided.

16 Claims, 13 Drawing Sheets

(56) References Cited

U.S. PATENT DOCUMENTS

| | | | | |
|---|---|---|---|---|
| 2013/0076194 A1* | 3/2013 | Benner, Jr. | ............ | H02K 33/16 |
| | | | | 310/216.022 |
| 2013/0181549 A1* | 7/2013 | Benner, Jr. | ............ | H02K 33/16 |
| | | | | 310/38 |
| 2016/0233753 A1* | 8/2016 | Benner, Jr. | ............ | H02K 11/21 |

FOREIGN PATENT DOCUMENTS

| | | | | |
|---|---|---|---|---|
| WO | WO-2009084251 A1 * | 7/2009 | ........... | H02K 17/185 |
| WO | 2016102353 A1 | 6/2016 | | |
| WO | WO-2016102353 A1 * | 6/2016 | ........... | H02K 19/103 |

* cited by examiner

HIGH TORQUE LOW INERTIA BRUSHLESS MOTOR

CROSS REFERENCE TO RELATED APPLICATION

This application claims the benefit of, and priority to, U.S. Provisional Patent Application Ser. No. 62/539,247, entitled "High Torque Low Inertia Brushless Motor," filed Jul. 31, 2017, the entirety of which is incorporated by reference and commonly owned.

FIELD OF THE INVENTION

The present invention relates generally to low inertia, continuous rotation motors that offer high rotational speed and high acceleration. Such motors may be particularly useful in the field of optical scanning.

BACKGROUND

Brushless motors have been in existence for decades and are used in a variety of industrial and consumer applications. To increase their utility, brushless motors may be coupled to position encoders and servo drivers. This combination offers the ability for the motor to rotate continuously in either direction for some period of time, and also stop rotating and be positioned very precisely when desired, based on the feedback of the position encoder.

When a brushless motor is coupled to a position encoder and servo driver, it has capabilities similar to those of galvanometer-based optical scanners. Galvanometer-based optical scanners are typically used with a position sensor and servo driver, and can position optical elements (such as mirrors, filters, prisms, etc.) very quickly and with high repeatability. Galvanometer-based scanners, however, lack the ability to rotate over an angle greater than about 40 degrees.

Despite the similarity of these two products, brushless motors have not found widespread use in optical scanning applications that involve rapid and precise back-and-forth positioning of optical elements. This is because brushless motors in the current state of the art typically lack the high acceleration demanded by these optical scanning applications. Because of this, despite their limited-angle drawbacks, galvanometer-based optical scanners have been the primary tool of choice for such applications.

An example of a Brushless DC-Servomotor of Series 0824006B is that manufactured by Faulhaber® and offered by the company MicroMo. According to the publicly-available datasheet for this motor, the rotor inertia is 0.0285 vGM*CM$^2$ and angular acceleration is 1,561,000 radians/second$^2$. While 1,561,000 radians/second$^2$ is among the highest angular acceleration rates currently achieved in the art for brushless motors, it is still much lower than the radial acceleration of available galvanometer-based optical scanners having almost the same rotor inertia.

An example of a well-known galvanometer-based optical scanner is the Cambridge Technology Model 6215. According to the publicly-available datasheet for this galvanometer, the rotor inertia is 0.028 GM*CM$^2$, which is almost identical to that of the Faulhaber® motor presented above. However, when a modest current of 8 amps is applied to the coil, the angular acceleration is 10,800,000 radians/second$^2$, which is nearly 7 times the angular acceleration of the Brushless DC-Servomotor presented above. Higher currents are actually possible with this scanner, which would provide even higher rates of angular acceleration.

In addition to the high acceleration capability, galvanometer-based optical scanners also offer the ability to operate with relatively high continuous currents. This is required when fast positioning and high speed motions are repeated over multiple duty cycles.

Again, as a point of comparison, and according to the datasheet for the Faulhaber® 0824006B, the rated current for continuous operation (thermal limit) is 0.66 amps and the coil resistance is 2.91 ohms. According to the datasheet for the Cambridge Technology Model 6215, the similar specification (RMS Current) is more than six times as high—4.1 amps, while the coil resistance of 2.53 ohms is similar to the Faulhaber® motor.

Brushless motors generally take on one of three topologies: slotless, toothed, or slotted. For the very small inertias typically involved in optical scanning, the slotless approach is used almost exclusively in galvanometer scanners. This involves the use of a small-diameter, two-pole rotor magnet, several coils located at a small radial distance away from the rotor magnet, and a steel "shell" on the outside. This shell may be a single cylindrical piece of steel or it may be laminated. An example of this motor construction is depicted in FIG. 1. The Faulhaber® motor described above is an example of a slotless motor. Although the construction depicted in FIG. 1 uses only two coils and the Faulhaber® motor uses three coils, the principles of operation are the same.

A toothed motor is one that has salient teeth formed within the steel outer shell (stator), pointing inward toward the rotor magnet. There are also toothed motor topologies in which the teeth point outward toward rotor magnets or other stator components. In a toothed motor, coils are wound around each tooth. An example of this motor construction is depicted in FIG. 2.

A slotted motor is similar to a toothed motor in that there are a number of slots cut into the steel outer shell (stator), with the slots pointing inward toward the rotor magnet. In a slotted motor, coil wires are placed within the slots. An example of this type of motor construction is depicted in FIG. 3.

As implied above, the ability to operate continuously is important in the field of optical scanning, where positioning of optical elements must occur rapidly and with a high duty cycle. Therefore, in the field of optical scanning, the slotless approach has several undesirable limitations that cannot be overcome. This is because, in order to improve continuous operation, the coil resistance must be reduced while the same torque is generated. This requires an increase in the area allocated to the coils. Since the coils reside in the space between the magnet and steel outer shell (which is actually the magnetic air gap), it means that this space must be increased. Unfortunately, increasing this space increases the air gap, which decreases flux density, which decreases torque production. Any gains that occurred due to increase of the copper area are inevitably offset by losses of flux density, which is why slotless motors have this inherent limitation.

With both toothed and slotted motors, it might be possible to increase the area allocated to the coils (within practical limits) and do so without decreasing flux density. However, the inventor of the embodiments disclosed herein is not aware of any brushless motors having inertia similar to typical galvanometer-based optical scanners that are made with anything other than the slotless topology. This may be because of the difficulty in placing the coil wires onto a stator with such a small interior diameter. Indeed, for motors having a rotor inertia of 0.028 GM*CM$^2$, the rotor magnet diameter is less than 0.125 inches (less than 3.2 mm).

As noted above, galvanometer-based optical scanners offer the ability to quickly position optical elements with high precision, but the drawback of these devices is that they can only be used over a limited range of rotation angles. A typical galvanometer-based optical scanner, for example, has a maximum rotation angle of only 40 degrees.

Clearly brushless motors are capable of continuous rotation, but lack the high acceleration capability that is often needed for optical scanning applications. Therefore there is a clear need in the art for a motor that offers the continuous rotation capability of a brushless motor, as well as the high acceleration capability of a galvanometer-based optical scanner. The embodiments disclosed herein are aimed at fulfilling these, and other needs, in the art.

SUMMARY

In one embodiment of the present disclosure, a brushless motor may comprise a rotor and a stator, wherein the stator includes four deep slots arranged as two pairs of slots into which two or more coils are placed. The stator may also include a means to limit cogging torques, such as, for example, a non-uniform air gap between the slots.

One embodiment of the present disclosure comprises a brushless motor formed with a stator having an aperture extending axially therein and four deep slots extending from the aperture to within the stator. The aperture is sized and shaped for accepting a rotor. The four slots may comprise first and second diametrically-opposed pairs of slots, wherein the first and second slot pairs are arranged orthogonally. For example, the first pair of slots may be oriented along a first axis, and the second pair of slots may be oriented along a second axis, wherein the first and second axes are generally or substantially orthogonal. At least one electrical coil is placed into each pair of slots. Due to the orthogonal arrangement of coils, this provides a two-phase, or sine/cosine, coil configuration excitable for providing bidirectional torque to the rotor. The rotor may have a two-pole diametral-magnetized magnet bidirectionally operable with the stator and extending into the aperture thereof, wherein a separation is formed between the magnet and the stator. Some embodiments may comprise a non-uniform separation formed between the magnet and the contoured ends that form a portion of the aperture between each of the slots. The non-uniform separation serves to limit cogging torques that might otherwise be present.

One embodiment of the present disclosure includes a motor comprising a stator defining an aperture extending axially therein. The stator may be formed from magnetically-conductive stacked laminations. A rotor having a two-pole diametral-magnetized magnet bidirectionally operable within the aperture is also disclosed, wherein a separation is formed between the magnet and the stator. First and second pairs of opposing slots may be formed within the stator, wherein the first pair of slots is generally aligned orthogonally to the second pair of slots. In one embodiment, a distance between an outer peripheral surface of the stator and the slots is greater than or equal to the depth of the slot. In another embodiment, a distance between an outer peripheral surface of the stator and the slots is less than or equal to the depth of the slot. Further, the stator may comprise contoured protrusions between the slots, the contoured protrusions defining either a uniform or non-uniform gap between the stator and the rotor.

A first electrical coil may be positioned within the first pair of slots, wherein the first electrical coil is excitable for (and thus configured for) providing bidirectional torque to the rotor over a first range of angles. The first range of angles may comprise any range of angles between and including, for example, −90 degrees to +90 degrees (180 degrees peak to peak) relative to a first axis.

A second electrical coil may be positioned within the second pair of slots, wherein the second electrical coil is excitable for (and thus configured for) providing bidirectional torque to the rotor over a second range of angles that are orthogonal to the first range of angles provided by the first electrical coil. The second range of angles may comprise any range of angles between and including, for example, −90 degrees to +90 degrees (180 degrees peak to peak) relative to a second axis that is orthogonal to the first axis.

Thus, in one embodiment, the first range of angles comprises a first limited range of angles and the second range of angles comprises a second limited range of angles. Since the first and second limited range of angles overlap, and since the first range of angles and second range of angles are orthogonal to one another, continuous rotation is possible given the appropriate excitation to the coils.

In one embodiment, a depth dimension of the slots is greater than a width dimension of the coils. In one embodiment, the first electrical coil comprises a first pair of electrical coils. In yet another embodiment, the second electrical coil comprises a second pair of electrical coils. The first electrical coil may comprise a cosine coil, and the second electrical coil may comprise a sine coil, or vice versa (i.e. a first sine coil and a second cosine coil).

In one embodiment of the present disclosure, exciting the first electrical coil produces torque over a first range of angles. In one embodiment, exciting the second electrical coil produces torque over a second range of angles.

Another embodiment of the present disclosure includes a stator defining an aperture therein for use in a brushless motor, the stator comprising a first pair of opposing slots configured for receiving a first electrical coil, and a second pair of opposing slots configured for receiving a second electrical coil. The second pair of slots are generally and/or substantially aligned orthogonally to the first pair of slots. The stator material may define a contoured surface between each slot. In one embodiment, a distance between an outer peripheral surface of the stator and at least one slot is at least as great as a depth dimension of a slot. In one embodiment, the slots each define a non-uniform curvature of stator material.

Yet another embodiment of the present disclosure includes a brushless motor comprising a stator defining an aperture extending axially therein; a rotor having a magnet bidirectionally operable within the aperture, wherein a separation is formed between the magnet and the stator; a first pair of slots formed within the stator; a second pair of slots formed within the stator, the second pair of slots generally aligned orthogonally to the first pair of slots; a first electrical coil within the first pair of slots, wherein the first electrical coil is excitable for providing bidirectional torque to the rotor over a first limited range of angles; and a second electrical coil within the second pair of slots, wherein the second electrical coil is excitable for providing bidirectional torque to the rotor over a second limited range of angles that are orthogonal to the first limited range of angles provided by the first electrical coil. In one embodiment, the magnet comprises a two-pole diametral-magnetized magnet.

BRIEF DESCRIPTION OF THE DRAWINGS

For a fuller understanding of the embodiments disclosed herein, reference is made to the following detailed description, taken in connection with the accompanying drawings illustrating various embodiments of the present disclosure, in which.

DETAILED DESCRIPTION OF EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. The embodiments disclosed herein are provided so that this disclosure will be thorough and complete, and will fully convey the scope of the embodiments to those skilled in the art. One of ordinary skill in the art, having the benefit of the present disclosure, will appreciate that the various elements of the several embodiments may be rearranged and/or combined without departing from the scope of the present disclosure.

Figure 1:
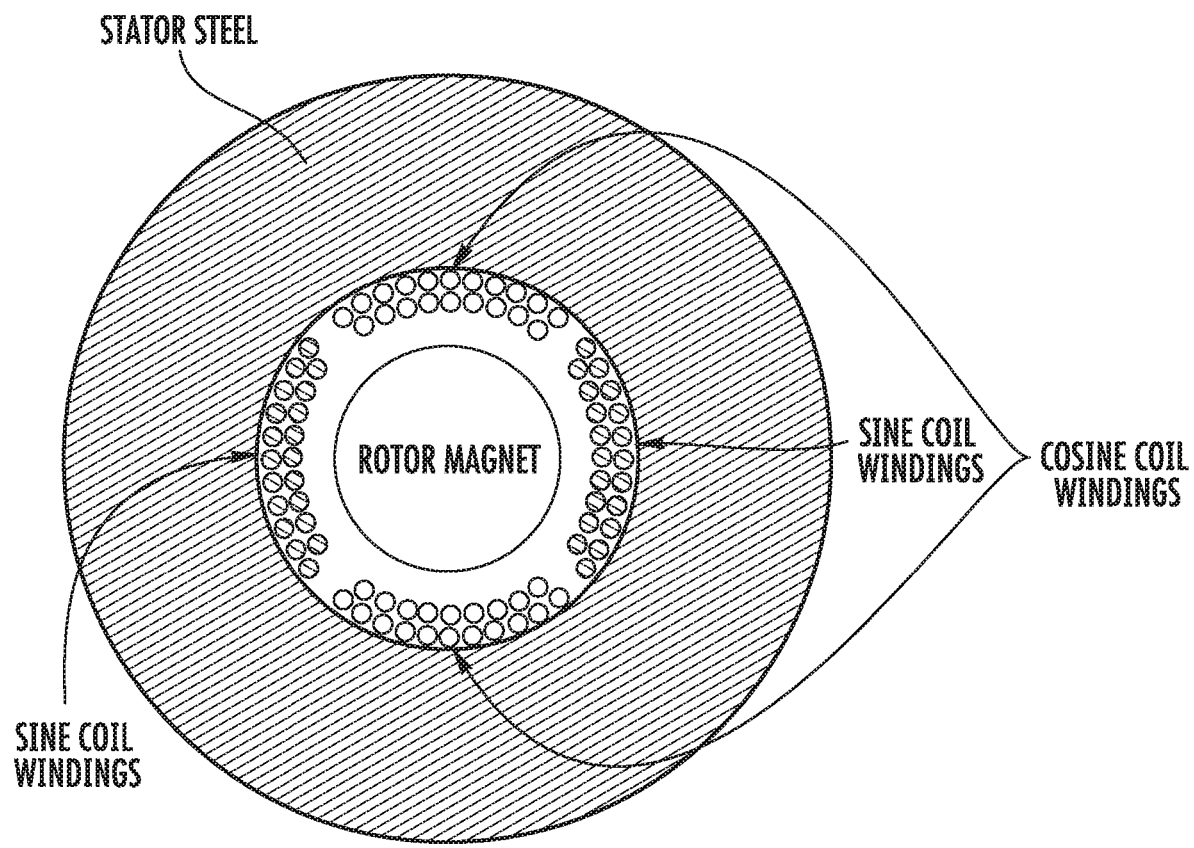
FIG. 1 is a top, cross-sectional view of a typical prior art slotless motor.
Figure 2:
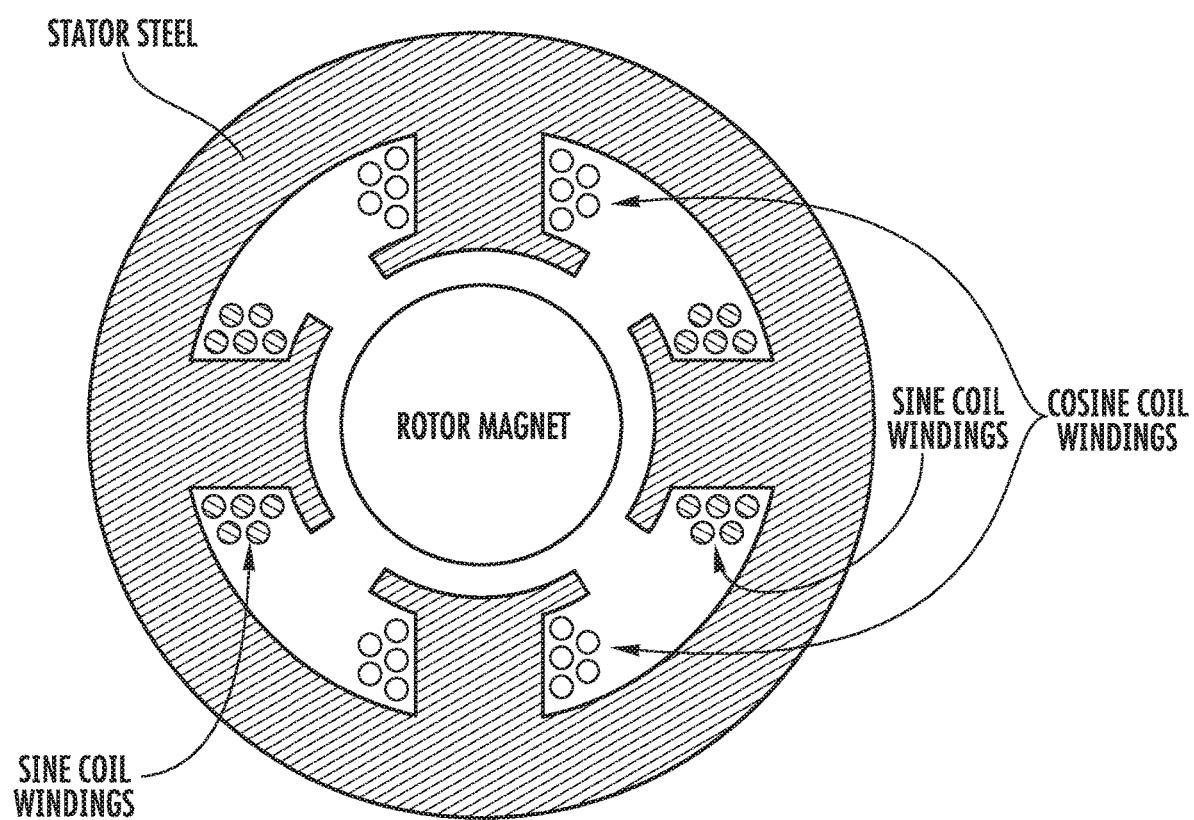
FIG. 2 is a top, cross-sectional view of a typical prior art toothed motor.
Figure 3:
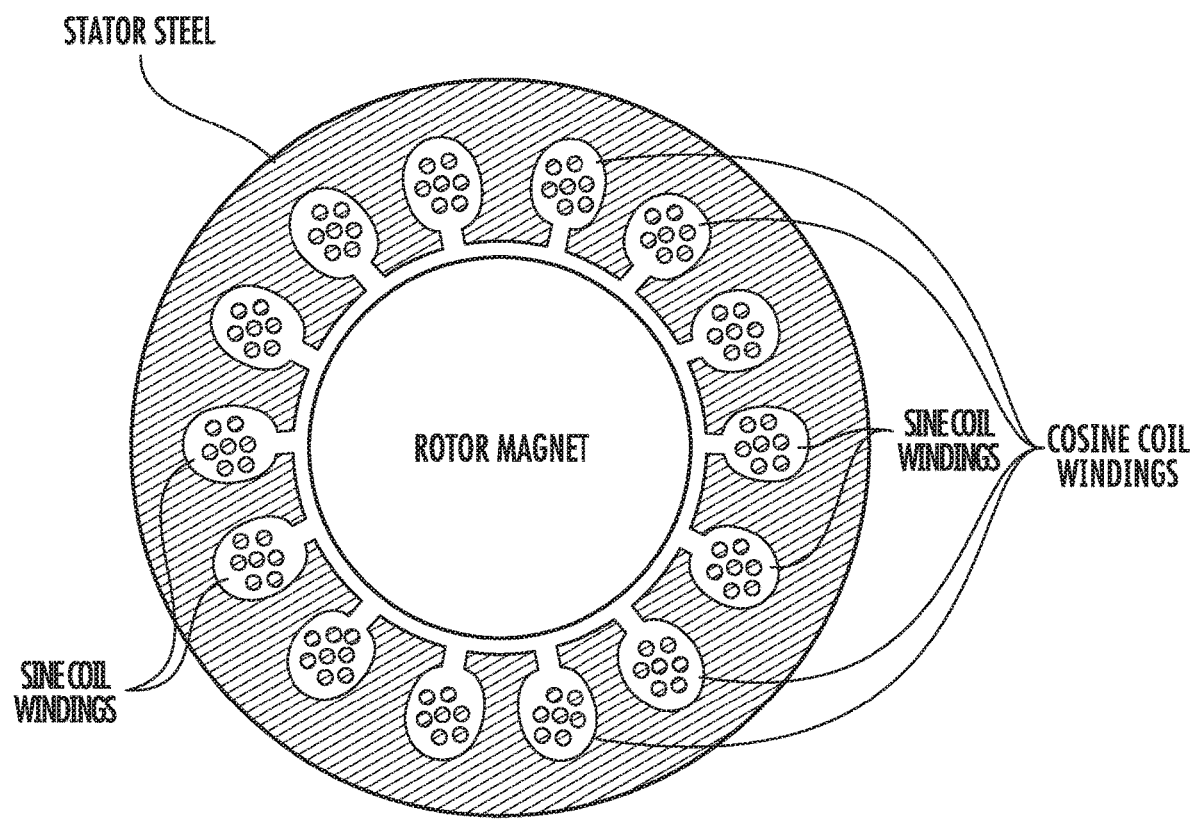
FIG. 3 is a top, cross-sectional view of a typical prior art slotted motor.
Figure 4:
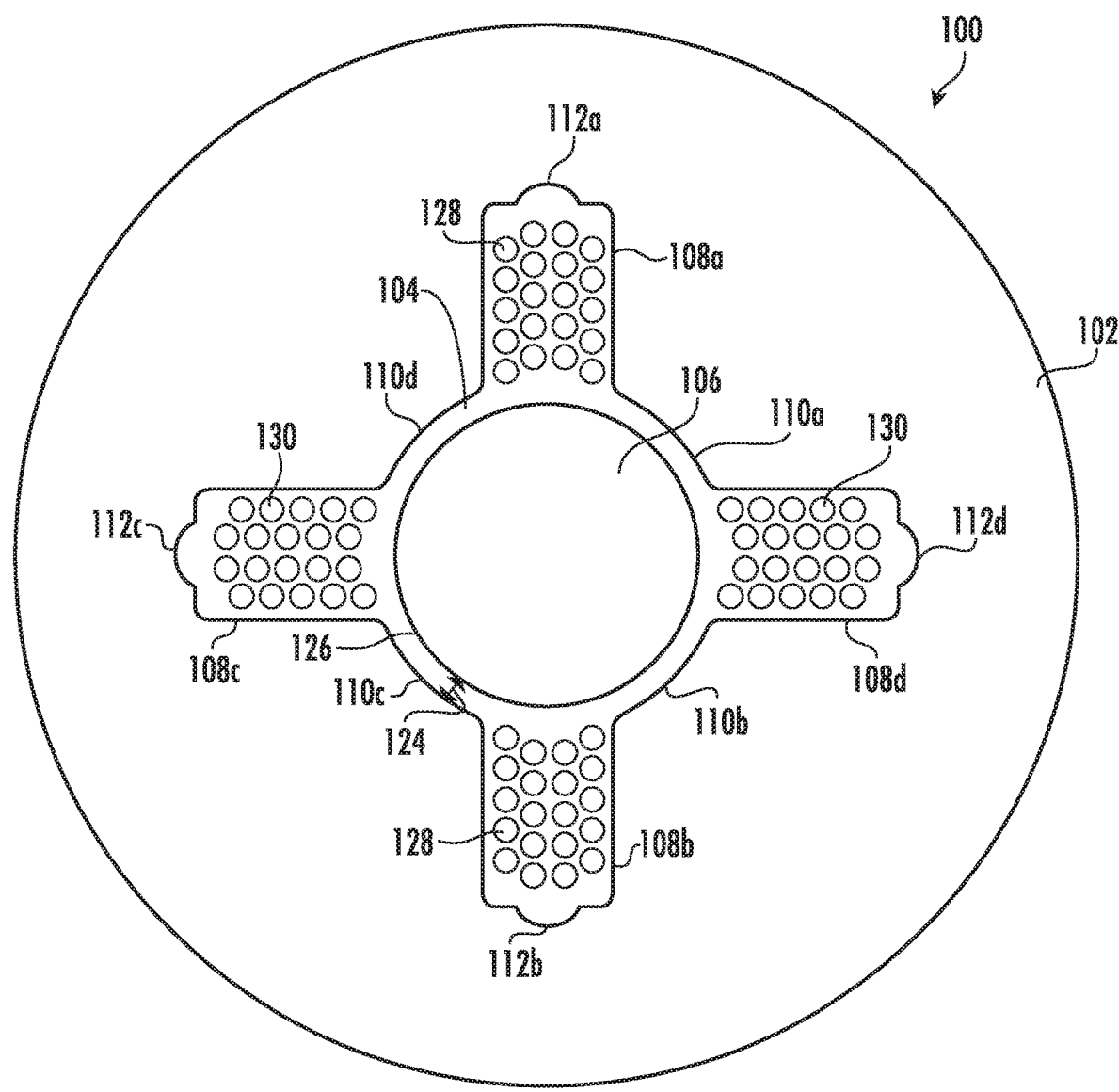
FIG. 4 is a top, cross-sectional view of an embodiment of the present disclosure, depicting the stator, rotor, and coil windings.
Figure 5:
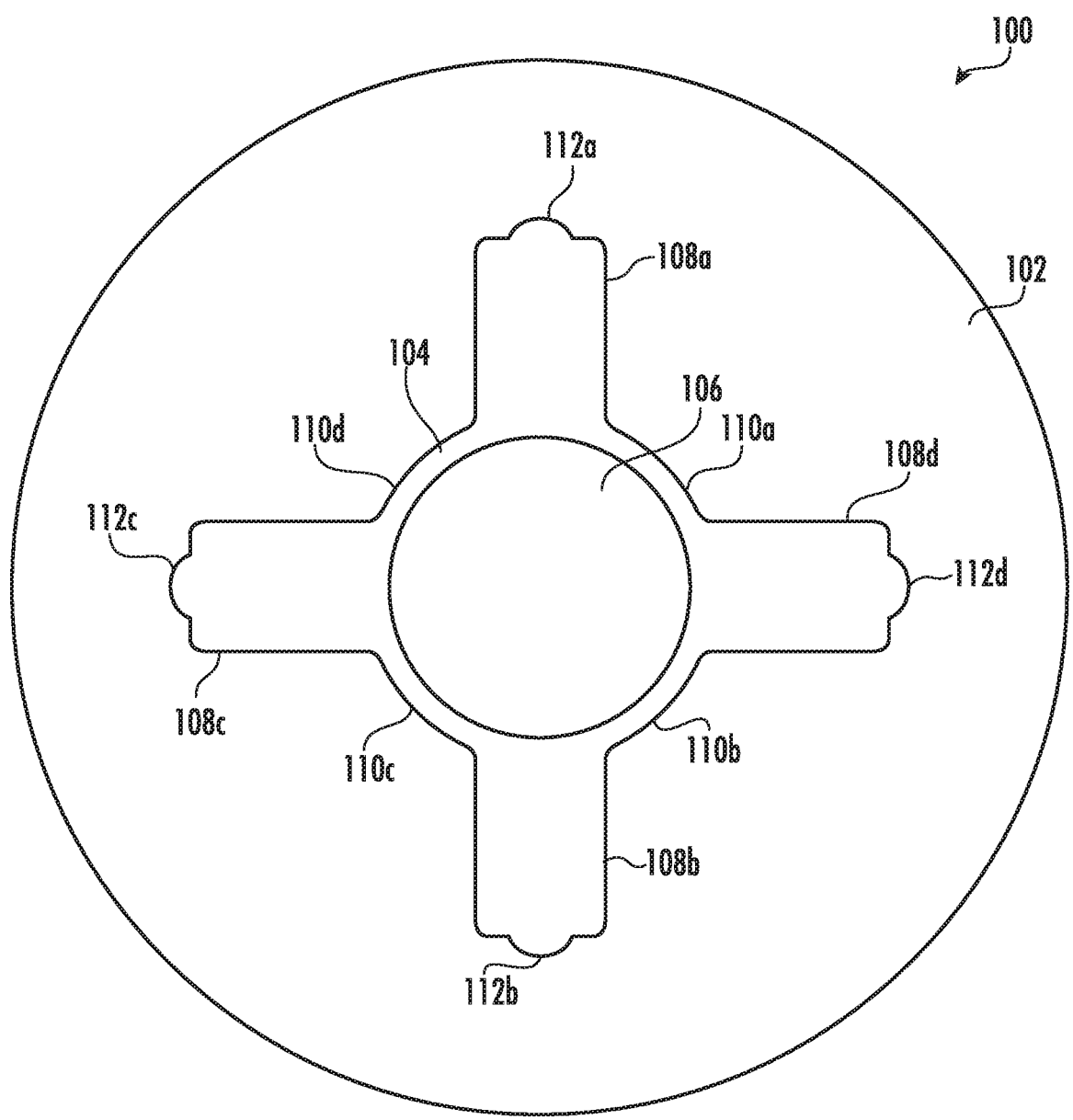
FIG. 5 is a top, cross-sectional view of an embodiment of the present disclosure, depicting the stator and rotor.
Figure 6:
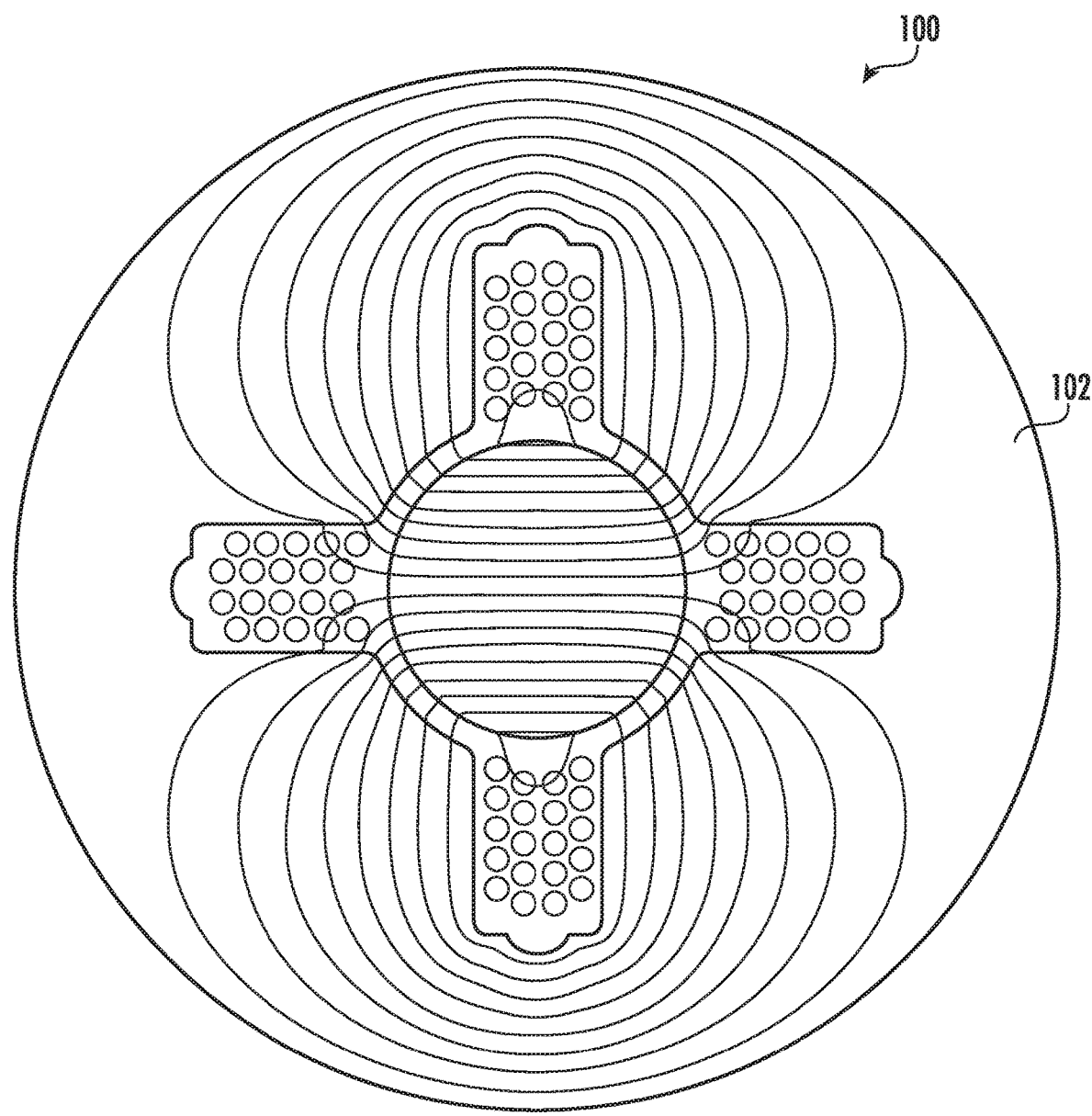
FIG. 6 is a top, cross-sectional view of an embodiment of the present disclosure, depicting how flux lines flow through the embodiment.

Referring initially to FIGS. 4-6, one embodiment of the present disclosure comprises a brushless motor 100. The motor includes a stator 102 defining an aperture 104 extending axially therein, wherein the aperture 104 is sized and shaped for receiving a rotor 106. In one embodiment, the aperture 104 defines four slots 108 a-d and four contoured ends 110 a-d between the slots. The slots defined by the stator may further define notches 112 a-d, said notches defined by an absence of stator material at an end of a slot distal the aperture.

Figure 10:
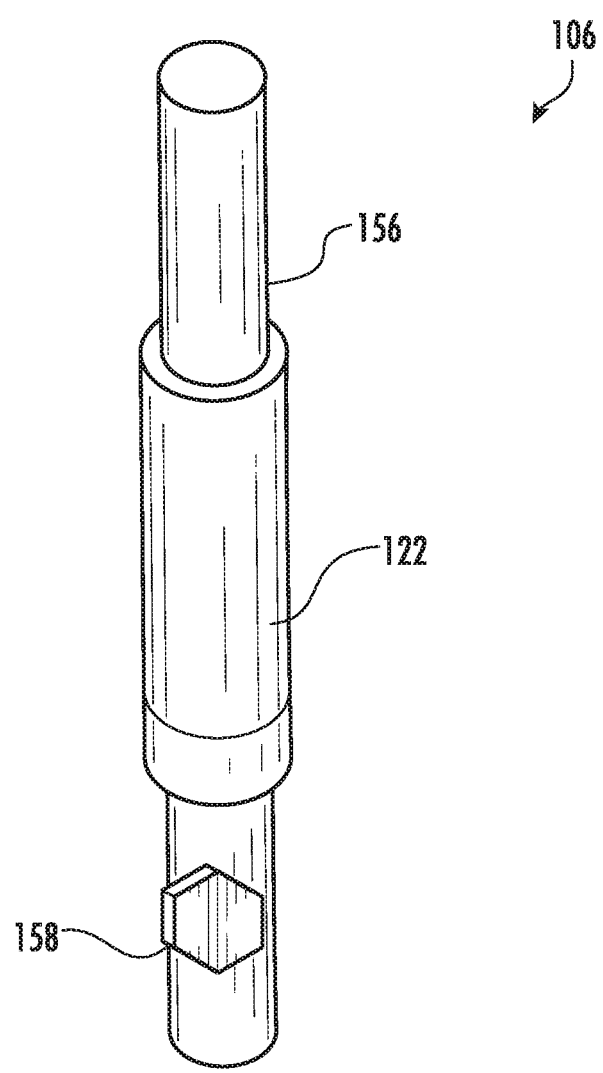
FIG. 10 is a perspective view of an exemplary rotor construction of the present disclosure.

As depicted in FIGS. 4 and 10, an embodiment of a rotor 106 comprises a two-pole diametral-magnetized magnet 122 bidirectionally operable with the stator 102 (FIG. 4) and configured for extending into the aperture 104. A separation 124, such as an air-gap, is formed between an outer surface 126 of the rotor 106 and the contoured ends of the aperture 110 a-d, between the slots 108 a-d.

In one embodiment, the four slots 108 a-d (first 108a, second 108b, third 108c, and fourth 108d slots) comprise diametrically-opposed pairs of slots, arranged orthogonally. Thus, as depicted in FIG. 4, one of the pairs of slots may be oriented vertically, or along a first axis, (108a, 108b), and the other pair may be oriented horizontally, or along a second axis, (108c, 108d). The slots 108 a-d define areas where electrical coils 128, 130 may be inserted.

Figure 7:
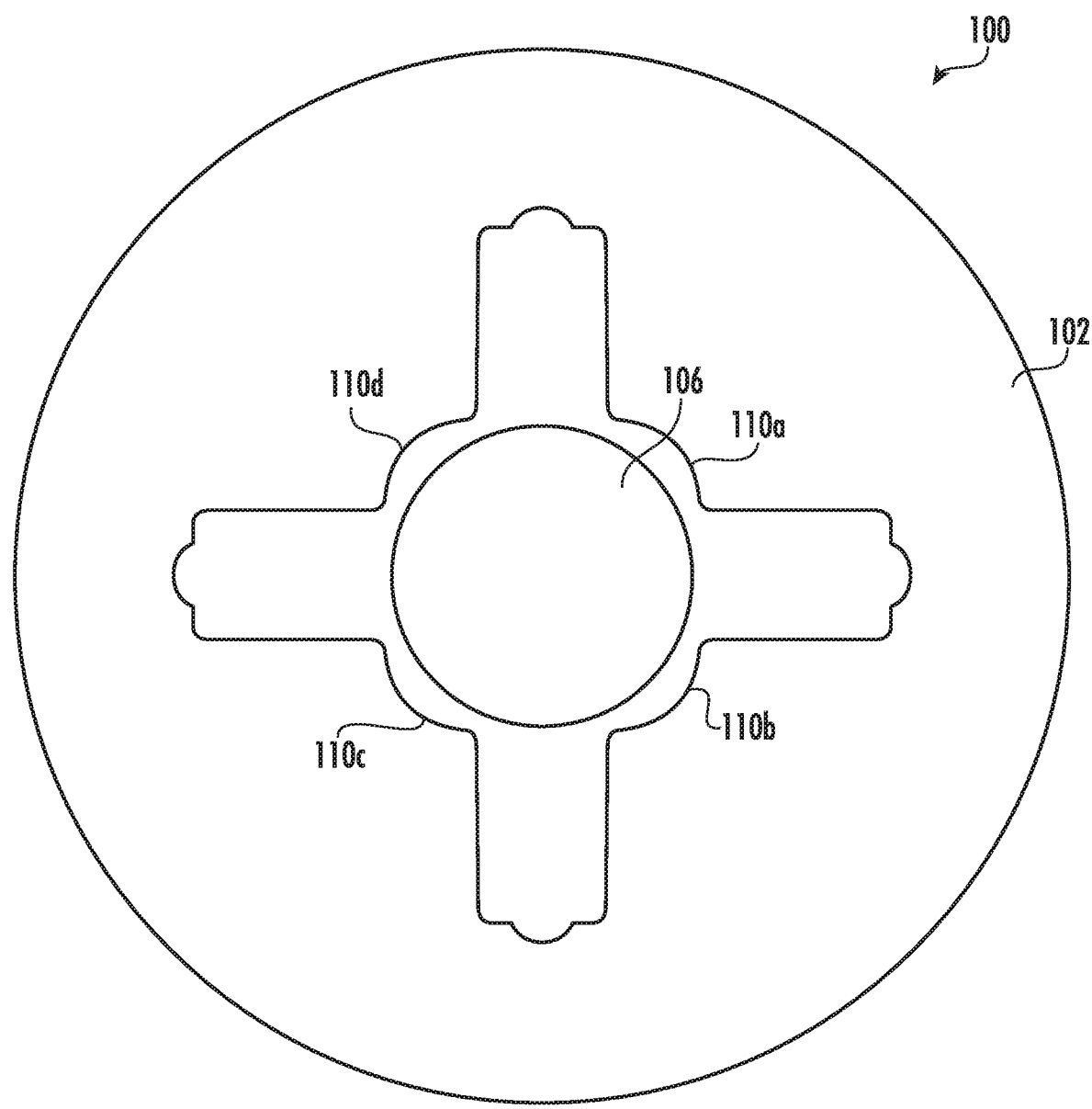
FIG. 7 is a top, cross-sectional view of another embodiment of the present disclosure, wherein an airgap between the rotor and stator is non-uniform.

In order to fit electrical coils 128, 130 into the slots 108a-d, and also have a desirable conductor packing density, the coils 128, 130 are externally preformed and preferably made as described in U.S. Pat. No. 9,530,559 (the "'559 Patent"), the entirety of which is incorporated by reference. Specifically, the coils 128, 130 used in connection with embodiments of the present disclosure are best formed such that they define a "racetrack" shape as shown in FIG. 7 of the '559 Patent. Other suitable coil configurations, however, are within the scope of the present disclosure.

Figure 8A:
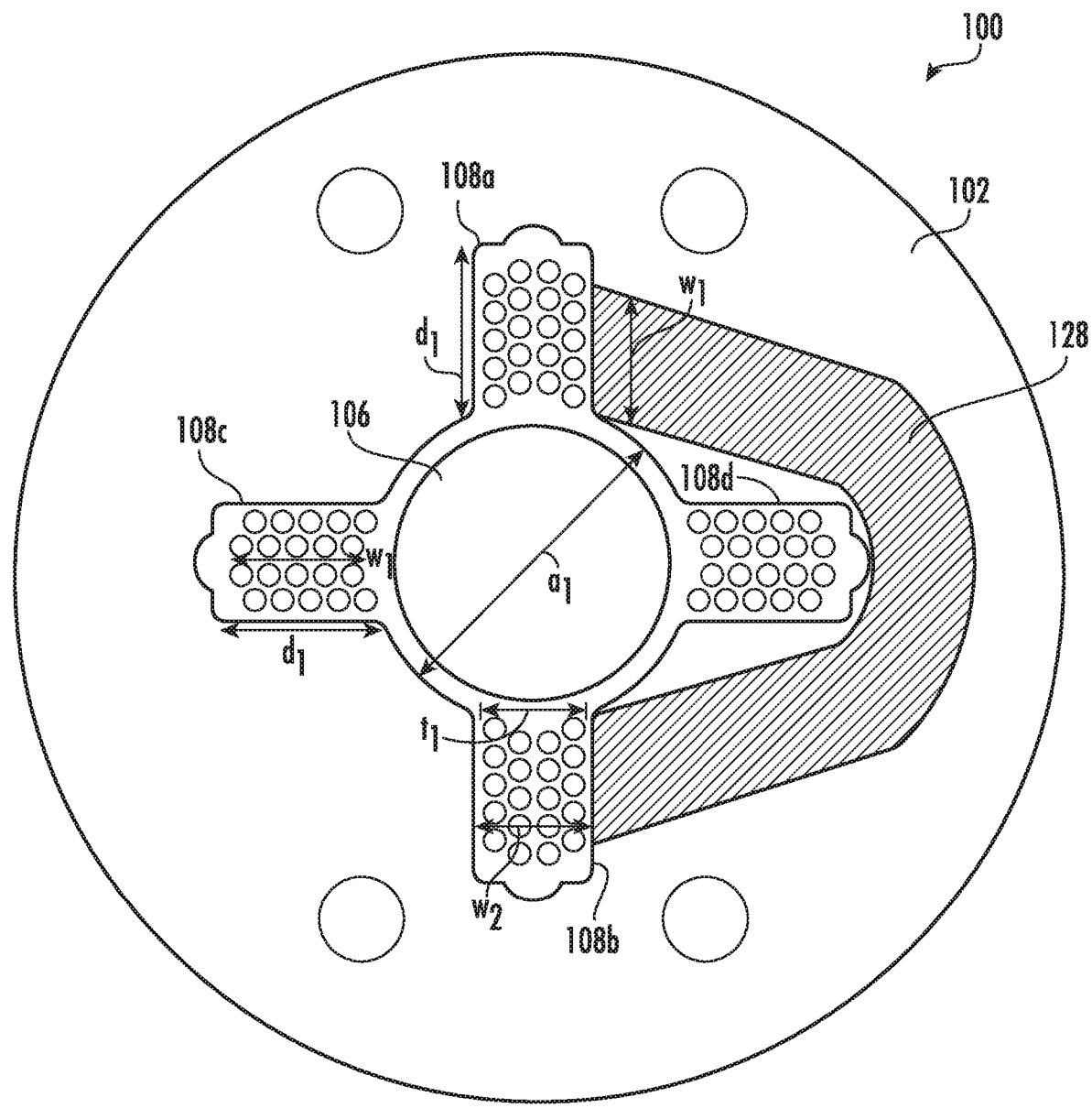
FIG. 8a is a top, cross-sectional view of an embodiment of the present disclosure illustrating exemplary end-turns of the electrical coil windings.
Figure 8B:
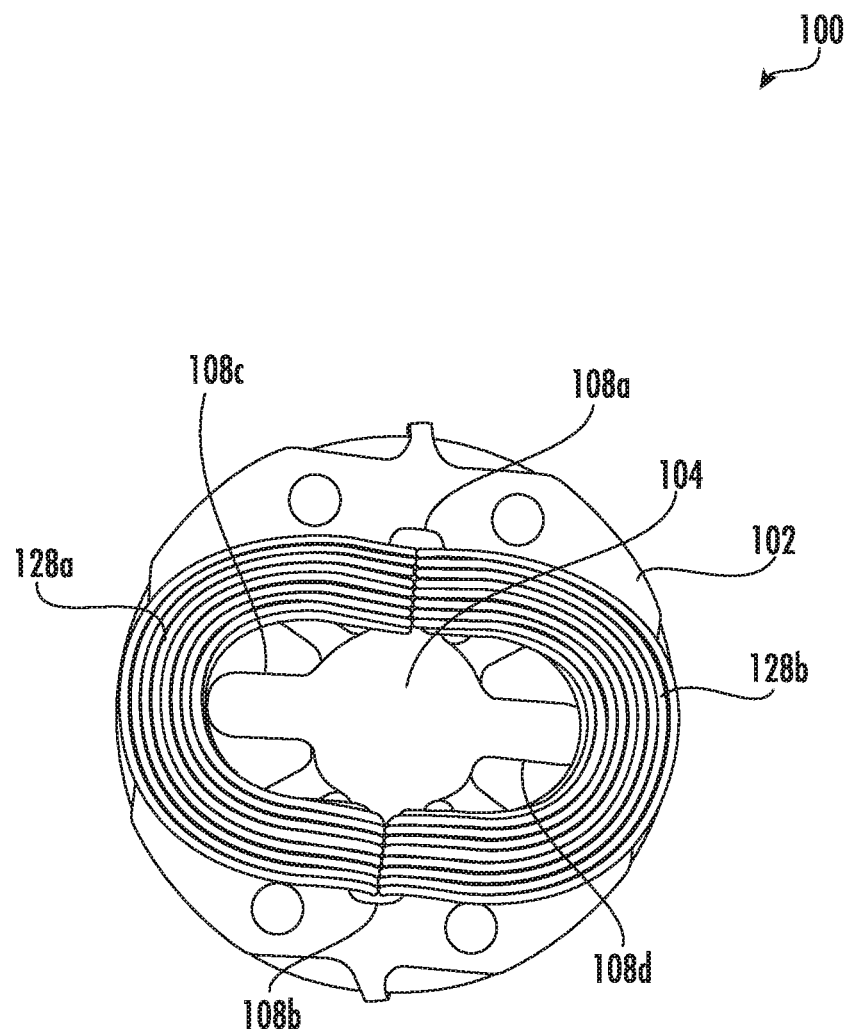
FIG. 8b is a top view of an embodiment of the present disclosure illustrating one manner in which the first, or cosine, coil windings may be inserted.

In one embodiment, each slot 108 a-d is sized such that the depth dimension d1 of the slot is greater than a width dimension w1 of a coil 128, 130 (see FIG. 8A). Likewise, a width dimension of each slot w2 may be greater than a thickness dimension t1 of the coil (or pair of coils as further described below).

During assembly of an embodiment described herein, and as depicted in FIGS. 8a-9b, a first electrical coil 128 is inserted into the vertically-oriented, or first, slot pair 108a, 108b (referred to as the "cosine coil" in this example). Once the first coil 128 is inserted into the vertically-oriented slot pair 108a, 108b, the ends of the coil (referred to as "end-turns") are folded over in such a way that these end-turns do not occlude the horizontally-oriented, or second, slot pair 108c, 108d. This coil configuration is depicted in FIG. 8b. This enables an unimpeded insertion of a second electrical coil 130 into the horizontally-oriented slot pair 108c, 108d (referred to as the "sine coil" in this example).

The coil(s) may comprise magnet wire, which is typically copper wire having an electrically insulating varnish over top. The insulating varnish prevents the turns of the coil from shorting out against other turns of the coil, and also prevents turns of the coil from shorting out against the stator material, which is electrically conductive. To enhance the insulation afforded by the varnish, the stator material, or steel, may include electrically-insulating coatings or thin liners, particularly in areas where the end-turns are folded over.

Although it is possible, using coils that are made in a conventional manner and having a conventional thickness, to insert a first coil into the vertical slot pair (the cosine coil), and a second coil into the horizontal slot pair (the sine coil), thus having only a single coil for each of the sine and cosine drive, it may be difficult in some instances to fold each coil over as desired. This is because the coils used in connection with embodiments of the present disclosure are externally pre-formed and preferably using "bondable" magnet wire as described in U.S. Pat. No. 9,530,559. Coils that are thick enough to take up the entire width of a slot would have several layers of magnet wire all bonded together. This may make it difficult to fold without damaging the magnet wire. For that reason, it is preferable, in one embodiment, to insert a pair of coils (i.e. first pair 128a, 128b; second pair 130a, 130b) into each slot pair, wherein a combined thickness of the two coils is less than a width of the slot. Once the coils are inserted into the slots and folded over, the coil wires within each pair may be connected in series or parallel for driving externally.

Figure 9A:
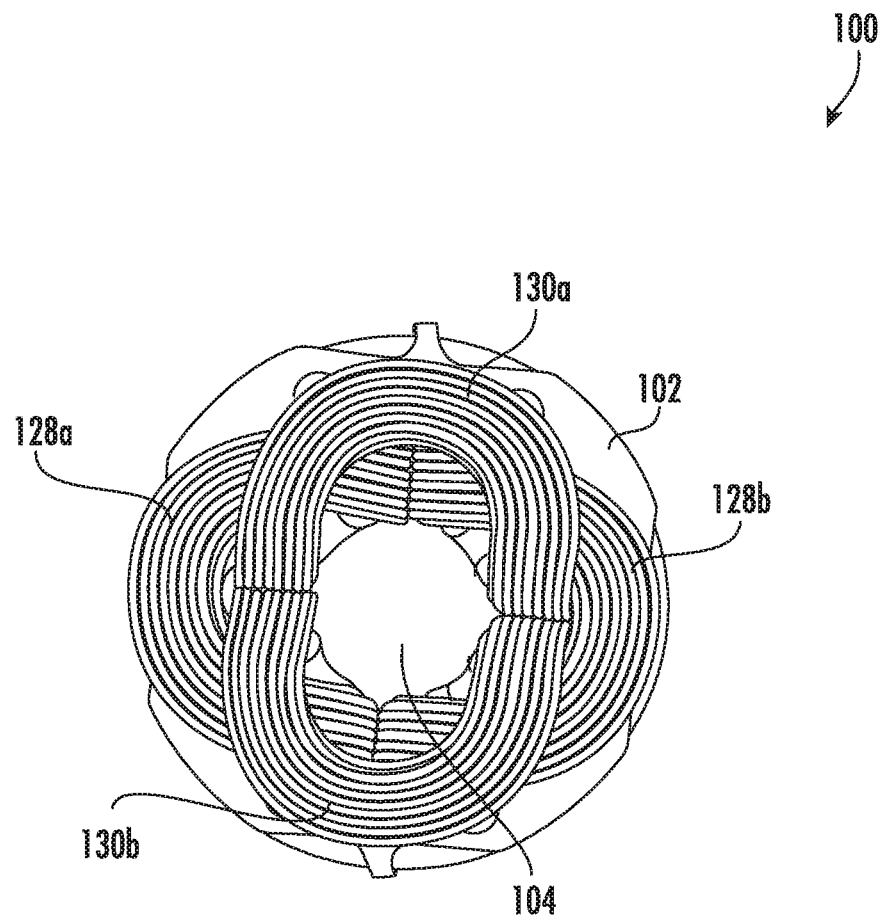
FIG. 9a is a top view of an embodiment of the present disclosure illustrating one manner in which the second, or sine, coil windings may be inserted with end turns on top of the cosine coil windings.
Figure 9B:
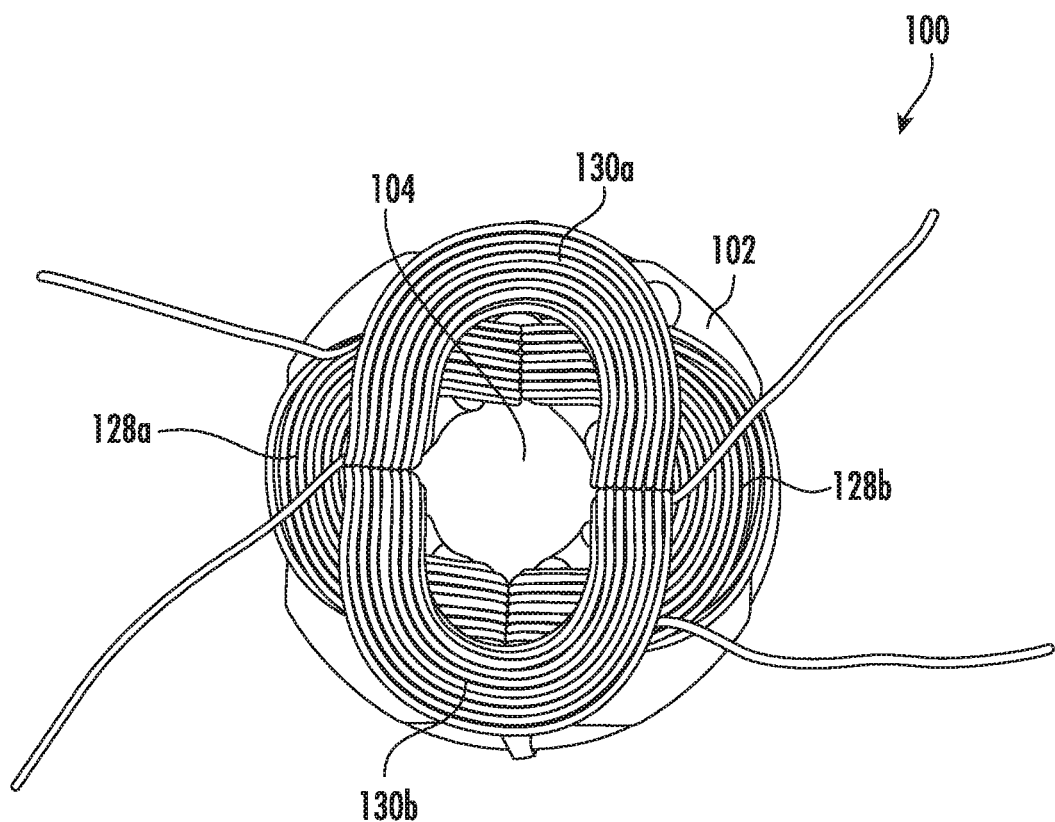
FIG. 9b is a bottom view of the embodiment of FIG. 9a illustrating four coil wires (two for the first coil and two for the second coil)

Once the cosine coil (or first pair of coils) is inserted into the vertical, or first, slot pair and end-turns folded over, the sine coil (or second pair of coils) can be inserted into the horizontal, or second, slot pair. The end-turns for the sine coils are folded over such that they are essentially on top of the end-turns of the cosine coils, as shown in FIG. 9a and FIG. 9b. Once both the cosine-coil and sine-coil are inserted and end-turns folded over, the aperture is unobstructed, and can receive the rotor 120 of the present disclosure.

Thus, one embodiment of the present disclosure includes a method for assembling a motor, the method comprising (i) procuring a stator defining an aperture extending axially therein, the stator having a first pair of opposing slots configured for receiving a first electrical coil and a second pair of opposing slots configured for receiving a second electrical coil, the second pair of slots generally aligned orthogonally to the first pair of slots; (ii) inserting a first coil into the first pair of opposing slots in such a way that the end-turns of the first coil do not occlude the second pair of opposing slots or the aperture; (iii) inserting a second coil into the second pair of opposing slots in such a way that the end-turns of the second coil do not occlude the aperture. The method may further comprise inserting a rotor into the aperture. In one embodiment, the rotor comprises a two-pole diametral-magnetized magnet. In one embodiment, the first coil 128 comprises a pair of coils 128a, 128b connected in series or in parallel. In one embodiment, the second coil 130 comprises a pair of coils 130a, 130b connected in series or in parallel.

In embodiments wherein the first and second coils comprise first and second pairs of coils, respectively, a method for assembling a motor having a stator defining first and second slot pairs and an aperture, wherein the first slot pair is generally, or substantially, orthogonal to the second slot pair, comprises (i) inserting a first coil into the first slot pair; (ii) folding the end turns of the first coil orthogonally from an axis of the first coil and toward the stator in such a way that the end turns do not occlude a slot in the second slot pair; (iii) inserting a second coil into the first slot pair; (iv) folding the end turns of the second coil orthogonally from an axis of the second coil and toward the stator in such a way that the end turns do not occlude a slot of the second slot pair; (v) inserting a third coil into a slot of the second slot pair; (vi) folding the end turns of the third coil orthogonally from an axis of the third coil and toward the stator in such a way that the end turns do not occlude a slot of the first slot pair and the aperture; (vii) inserting a fourth coil to a slot of the second slot pair; and (viii) folding the end turns of the fourth coil orthogonally from an axis of the fourth coil and toward the stator in such a way that the end turns do not occlude a slot of the second slot pair and the aperture.

The electrical coils 128, 130 may be excitable for providing bidirectional torque to the rotor 106. Notably, energizing a single coil will not provide continuous rotation. Energizing the cosine coil alone will cause the north/south pole orientation of the rotor magnet to become aligned orthogonal to that coil, after which no further rotation would take place. Fortunately, once the rotor is in that position, energizing the sine coil will cause the rotor magnet to rotate in a direction orthogonal to the sine coil and parallel to the cosine coil. Thus, each individual coil produces torque over only a limited range of angles, and the actual rotor magnet direction and torque depends on the current flowing through the coils and how that current is coordinated. Continuous rotation requires the coils to be energized sequentially in a sine/cosine drive fashion.

Figure 11:
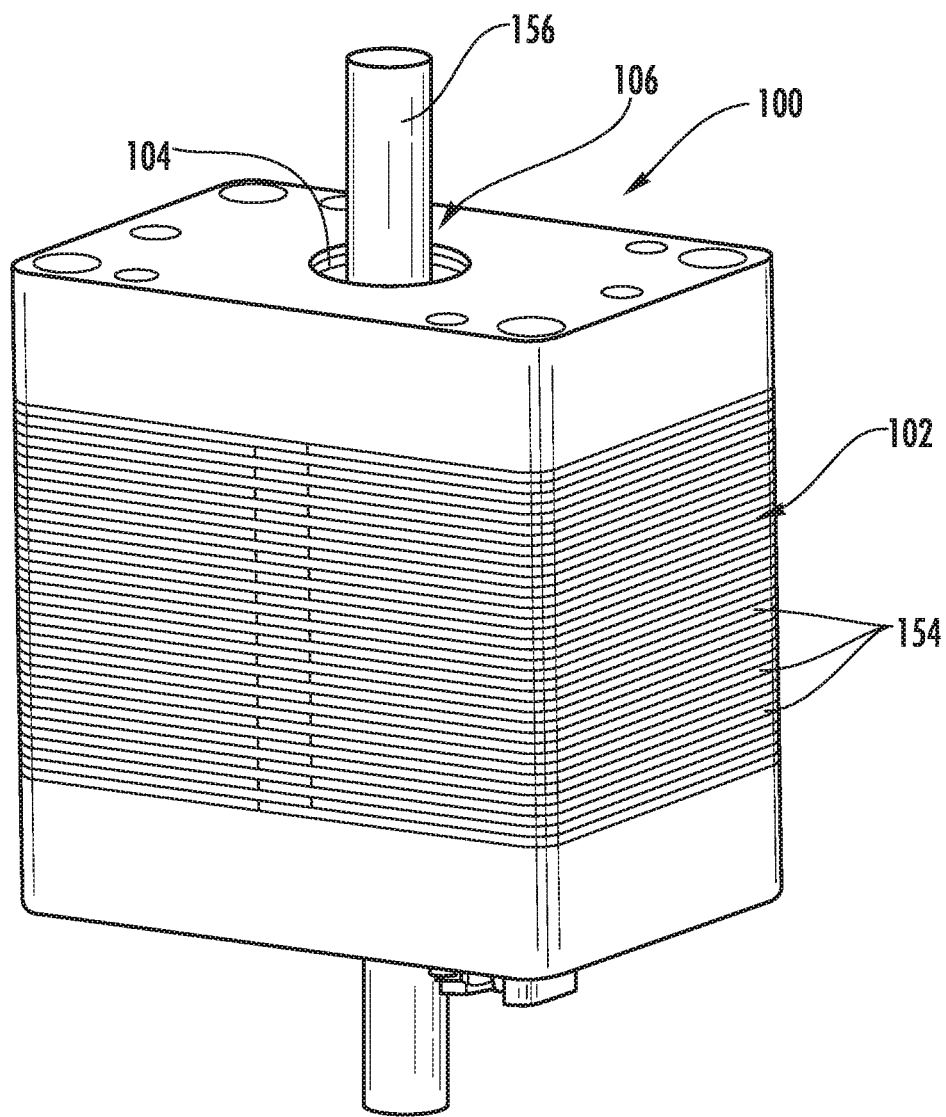
FIG. 11 is a perspective view of an embodiment of the present disclosure, depicting multiple stator laminations and a rotor.

As depicted in FIG. 11, the stator 102 may comprise multiple, thin, sheets of metal, herein referred to as laminations 154. The laminations 154 may be assembled to form a desired exterior and interior shape. The shape of each lamination 154 may be created by metal stamping, laser cutting, photo-etching, water-jet cutting, or other known methods of forming a shape from sheet metal. The laminations 154 may be made from a silicon-steel material known as M-19, a material specially made for motors and electrical transformers. However, many different materials will work, as long as the material is magnetically conductive. A few possible alternative materials include a cold-rolled steel (such as Q-195) and magnetic stainless steel (such as stainless steel 416).

In one embodiment, the stator 102, which is illustrated in cross section in FIG. 4, comprises a cylindrical outer shape. It will be understood by those skilled in the art, having the benefit of the teachings of the present disclosure, that alternative shapes may be employed in connection with embodiments of the present disclosure, such as, for example, the rectangular cross section shape of the motor 100A shown in FIG. 11, without departing from the teachings of the present disclosure.

In one embodiment, the outer dimensions of the stator 102 are sized such that there is enough magnetic material between the deep, or distal, end of each slot and the outside of the stator, such that the stator material is sufficient to conduct the magnetic flux. The outside dimension of the stator may also provide sufficient room so that when the end-turns are folded over, they do not exceed the outside dimensions of the stator steel. This generally means that the distance between the outside of the stator and the slot must be at least as great as the depth dimension of a slot.

To increase efficiency further, the slots can be made deeper so that more turns of electrical coil can fit within the slots. As described above, this will generally require that the outside dimensions of the stator also be increased proportionally. As the slots become deeper, the end-turns of each electrical coil must become longer. At a certain dimension, the length of the end-turns will exceed the length of the conductors that are within the stator slots. Since the end-turns do not contribute to torque, but do contribute to weight, electrical resistance, heat (due to current flowing through the end turns, which have electrical resistance), and electrical inductance, it therefore follows that in order to maximize motor efficiency, it is desirable to maximize the height of the stator and minimize the length of the end-turns within practical limits.

Once the stator is assembled and coils are inserted, the coils may be retained in place with, for example, a thermally-conductive epoxy. Such epoxy also helps to conduct any heat produced by the coils to the stator.

The rotor magnet 122 for use in connection with one embodiment (see FIG. 10) comprises a neodymium iron boron material. The rotor magnet 122 may be integrally formed with, or configured for attachment to, a shaft 156, wherein the shaft carries an optical element 158 attached thereto. The optical elements may comprise a mirror, prism, grating disk, aperture wheel, or any other suitable item.

With continued reference to FIG. 10, the shaft 156 may be made of stainless steel, although practically any material can be used so long as the material can withstand the torque and radial loads produced by the motor 100 and any external load connected to the motor within the environment being operated. As above described, the shaft 156 may be integrally formed with the rotor magnet 122 or may be attached to the magnet using adhesives such as epoxy.

The simplest way to manufacture the rotor magnet 120 is to use a single cylindrical piece of magnet material that is diametral magnetized. The rotor 120 may also be made from two or more magnets, so long as the combination of magnets provides a north pole diametrically opposed from a south pole. Thus, other suitable magnets are considered to be within the scope of the present disclosure.

By using a cylindrical rotor magnet 122 that is diametral magnetized, a sinusoidal flux-versus-angle profile results from the magnet. This, in turn, produces an approximately sinusoidal back-EMF profile and correspondingly sinusoidal output-torque versus angle profile for each coil. Since the slots (and thus the coils) are arranged orthogonally, a sine/cosine relationship results.

Note that the rotor magnet 122 may be made from any magnet material. However, highest performance is currently achieved by using neodymium iron boron N48H or better for the rotor magnet.

With continued reference to FIGS. 4 and 5, the rotor 106 sits in an aperture 104 defined by the stator 102. In one embodiment, the stator 102 has high magnetic permeability. The aperture 104 also has first 108a, second 108b, third 108c, and fourth 108d slots having very low magnetic permeability. Because of this, as the north/south poles of the rotor magnet 122 of the rotor 106 rotates, these poles are attracted to areas of the stator 102 where the stator material resides as opposed to the slot areas. Thus, the motor may experience cogging (sometimes referred to as "reluctance torques") as the rotor 106 is rotated. The embodiment shown in FIG. 7 illustrates one possible way to reduce cogging. In this embodiment, there is a non-uniform gap between the contoured ends of the stator and the rotor magnet 122. The increased air-gap in the middle of each contoured end makes that area of the stator 102 less attractive to the magnet 122, thus reducing cogging. Notably, however, even without the non-uniform gap or other cogging reduction means, the amount of cogging experienced by the rotor 106 may already be acceptably low.

To understand the benefits provided by embodiments of the present disclosure, the following are specifications of motors built in accordance with the embodiment depicted in FIG. 4. Such motors were built with a stator 102 having an outside diameter of 0.420 inches, and having an inside diameter of the aperture of 0.136 inches, with each slot being 0.048 inches wide and 0.071 inches deep. The stator 102 was made from a stack of 0.014 inch thick laminations made of M19 silicon steel having the shape shown in FIG. 4 and the laminations stacked to a collective height of 1.08 inches.

The exemplary rotor magnet 122 was made with high-grade Neodymium Iron Boron magnet material, having a diameter of 0.12 inches and length of 1.3 inches, attached to stainless steel shafts as described above, corresponding to a rotor inertia of 0.028 GM*$CM^2$.

The coil configuration consists of four coils, each one wound with 23 turns of AWG #33.5 wire wound as shown in FIG. 18 of U.S. Pat. No. 9,530,559, the entirety of which is incorporated by reference. Pairs of coils were inserted into slots as described above and connected in series. With this coil configuration, the peak torque constant (KT) from each of the sine and cosine phase windings was 44,045 D*CM per amp, inductance was 190 microhenry, and coil resistance was 3 ohms.

Cogging torque was found to be a maximum of 6,000 D*CM, which was acceptably low for optical scanning applications.

With a modest 8 amps applied to the coils, the radial acceleration was 12,584,286 radians/second, which exceeds that of both the conventional slotless brushless motor as well as the galvanometer-based optical scanner presented above. Other coil configurations are also possible.

When the motor was filled with a high quality thermally-conductive epoxy, thermal resistance was less than 1 degree C. per watt, resulting in a continuous RMS current capability of 4 amps.

Thus, embodiments of the present disclosure provide a continuous rotation motor having high acceleration capability as well as high continuous operational current. Moreover, the disclosed embodiments provide slot dimensions differing in size as compared to those of existing devices. For example, a consideration of a ratio of slot depth d1 to aperture diameter a1 in an embodiment constructed as defined herein provides a slot depth of 0.070 inches and a stator aperture of 0.136 inches. These dimensions yield a ratio of 0.070/0.136=0.514. For comparison with motors made in a conventional manner and having conventional dimensions, a representative lamination is Reuland®'s model 4143Z, which has a slot depth of 1.55 inches and aperture diameter of 6 inches, yielding a ratio of only 0.258. Regarding slot width, an exemplary embodiment of the present disclosure comprises a slot width w2 of 0.048 inches, resulting in a width-to-aperture ratio of 0.352. Thus, the present invention employs slots that are relatively wider and deeper than conventional motors found in the present state of the art.

Embodiments of the present disclosure provide a continuous-rotation motor capable of the high accelerations and high continuous performance that galvanometer scanners provide. The embodiments provide high performance in a device having dimensions much smaller than known devices.

Using the techniques disclosed herein, performance is not only improved over prior art devices, but the embodiments are also easier to assemble than those of the prior art. The stator laminations are produced using well-known, conventional, and low-cost manufacturing methods. The coils are made using the techniques described in the '556 Patent. The coils are inserted and folded over in a manner that is easy to accomplish. The entire motor can be built by hand if desired, eliminating any need to employ complex assembly devices. The embodiments disclosed not only accomplish things that no other motor has done up until now, but they accomplish them in a way that only requires low cost and commonplace manufacturing methods.

Although a detailed description and drawings of the invention has been provided above, it is to be understood that the scope of the invention is not to be limited thereby. Further, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

What is claimed is:

1. A brushless motor comprising:

a stator defining an aperture extending axially therein, the stator further defining a series of slots, the series of slots consisting of first and second pairs of opposing slots, wherein the second pair of opposing slots are aligned orthogonally to the first pair of opposing slots;

a rotor having a two-pole diametral-magnetized magnet bidirectionally operable within the aperture, wherein a separation is formed between the magnet and the stator;

a cosine coil within the first pair of slots, wherein the cosine coil is excitable for providing bidirectional torque to the rotor over a first limited range of angles; and a sine coil within the second pair of slots, wherein the sine coil is excitable for providing bidirectional torque to the rotor over a second limited range of angles that are orthogonal to the first limited range of angles provided by the cosine coil, wherein a sequential excitation of the sine coil and the cosine coil results in continuous rotation of the rotor.

2. The brushless motor of claim 1, wherein a depth dimension of the slots is greater than a width dimension of the coils.

3. The brushless motor of claim 1, wherein the cosine coil comprises a first pair of electrical coils.

4. The brushless motor of claim 1, wherein the sine coil comprises a second pair of electrical coils.

5. The brushless motor of claim 1, wherein exciting the cosine coil produces torque over a first range of angles.

6. The brushless motor of claim 1, wherein exciting the sine coil produces torque over a second range of angles.

7. The brushless motor of claim 1, the stator comprising magnetically-conductive stacked laminations.

8. The brushless motor of claim 1, wherein a distance between an outer peripheral surface of the stator and the slots is greater than or equal to the depth of the slot.

9. The brushless motor of claim 1, the stator comprising contoured protrusions between the slots, the contoured protrusions defining a uniform gap between the stator and the rotor.

10. The brushless motor of claim 9, the contoured protrusions defining a non-uniform gap between the stator and the rotor.

11. The brushless motor of claim 1, wherein the rotor magnet is integrally formed with a shaft, and wherein the shaft carries an optical element attached thereto.

12. The brushless motor of claim 11, wherein the optical element comprises at least one of a mirror, a prism, a grating disk, and an aperture wheel.

13. The brushless motor of claim 1, wherein the first and second pairs of electrical coils are externally pre-formed.

14. The brushless motor of claim 1, wherein a ratio of slot depth to aperture diameter is about 0.5.

15. The brushless motor of claim 1, wherein a ratio of slot width to aperture diameter is about 0.3.

16. A brushless motor comprising:

a stator defining an aperture extending axially therein;

a rotor having a two-pole diametral-magnetized magnet bidirectionally operable within the aperture, wherein a separation is formed between the magnet and the stator;

a first pair of slots formed within the stator;

a second pair of slots formed within the stator, the second pair of slots generally aligned orthogonally to the first pair of slots;

a first electrical coil within the first pair of slots, wherein the first electrical coil is excitable for providing bidirectional torque to the rotor over a first limited range of angles; and a second electrical coil within the second pair of slots, wherein the second electrical coil is excitable for providing bidirectional torque to the rotor over a second limited range of angles that are orthogonal to the first limited range of angles provided by the first electrical coil, wherein a sequential excitation of the first electrical coil and the second electrical coil results in continuous rotation of the rotor.

* * * * *